United States Patent
Huang et al.

(10) Patent No.: US 9,195,912 B1
(45) Date of Patent: Nov. 24, 2015

(54) FACE ANNOTATION METHOD AND A FACE ANNOTATION SYSTEM

(71) Applicant: National Taipei University of Technology, Taipei (TW)

(72) Inventors: Shih-Chia Huang, Taipei (TW); Ming-Kai Jiau, Taipei (TW); Chih-An Hsu, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/340,553

(22) Filed: Jul. 24, 2014

(51) Int. Cl.
*G06K 9/62* (2006.01)
*G06K 9/00* (2006.01)
*G06F 17/30* (2006.01)

(52) U.S. Cl.
CPC .......... *G06K 9/6293* (2013.01); *G06F 17/3028* (2013.01); *G06K 9/00288* (2013.01); *G06K 9/6259* (2013.01)

(58) Field of Classification Search
USPC ................. 382/115, 118, 157, 158, 209, 224; 348/211.99, 211.3
See application file for complete search history.

(56) References Cited

U.S. PATENT DOCUMENTS

| | | | | |
|---|---|---|---|---|
| 7,403,642 B2* | 7/2008 | Zhang | ............... | G06F 17/30265 382/118 |
| 7,508,419 B2* | 3/2009 | Toyama | ............ | G06F 17/30265 348/207.1 |
| 8,036,417 B2* | 10/2011 | Gallagher | ......... | G06F 17/30265 382/100 |
| 8,346,681 B2* | 1/2013 | Lauritsen | ............... | G06N 5/042 706/11 |
| 8,423,496 B1* | 4/2013 | Hauser | ..................... | G06N 5/02 706/47 |
| 8,751,942 B2* | 6/2014 | Lopez | .................... | H04N 5/445 345/157 |

OTHER PUBLICATIONS

Y. Freund et al., "A Decision-Theoretic Generalization of On-Line Learning and an Application to Boosting," Journal of Computer and System Sciences 55, vol. 55, No. 1, Dec. 19, 1996, pp. 119-139.
Y. Sun, et al., "Cost-sensitive boosting for classification of imbalanced data," Pattern Recognition, vol. 40, No. 12, Apr. 17, 2007, pp. 3358-3378.
C. A. Hsu, M. K. Jiau and S. C. Huang, "Automatic Face Annotation System Used Pyramid Database Architecture for Online Social Networks," IEEE International Conference on Ubiquitous Intelligence & Computing and IEEE International Conference on Autonomic & Trusted Computing, Dec. 18-21, 2013, pp. 685-690.

* cited by examiner

*Primary Examiner* — Yosef Kassa
(74) *Attorney, Agent, or Firm* — Jianq Chyun IP Office

(57) ABSTRACT

A face annotation method and a face annotation system adapted for a current owner to annotate contacts in online social networks (OSNs) are provided. The face annotation method includes: providing a Hierarchical Database Access (HDA) architecture for each member according to various social network contexts; providing a Fused Face Recognition (FFR) unit which uses an Adaboost algorithm to fuse a plurality types of base classifiers; and constructing a Face Recognizer by integrating the HDA architecture and the corresponding FFR unit for the owner and each member via respective types of the social network contexts; and selecting suitable personalized Face Recognizers and merging multiple personalized Face Recognizer results by using at least two collaborative FR strategies.

16 Claims, 7 Drawing Sheets

FACE ANNOTATION METHOD AND A FACE ANNOTATION SYSTEM

BACKGROUND OF THE INVENTION

1. Field of the Invention

The present invention generally relates to a face annotation techniques, in particular, to a face annotation method and a face annotation system employed within a collaborative framework and a multiple-kernel learning algorithm.

2. Description of Related Art

Due to the rapid growth of portable consumer devices and wireless communications services, people can send and receive multimedia content and information at any time and from any place. Increasing numbers of people are using wireless mobile applications to share personal photos via online social networks (OSNs) such as Facebook and Google+. This has resulted in large quantities of photo collections in OSNs. In order to facilitate effective browsing, searching, categorization, and exportation (e.g. sending or printing) of photo collections, it is important to develop face annotation techniques that allow users to manage and organize personal photos in OSNs, etc.

By using face annotation techniques, users are able to tag facial images in personal photos with the names of individuals. These techniques can be divided into three categories: manual face annotation, semi-automatic face annotation, and fully automatic face annotation. Manual face annotation for large numbers of photo collections is labor-intensive and time-consuming; because of this, many studies have investigated semi-automatic face annotation or fully automatic face annotation techniques. Semi-automatic face annotation requires user interaction and feedback to determine the identity label of each individual query for each personal photo. Unfortunately, these interaction and feedback procedures result in additional time consumption for practical face annotation systems. In order to avoid user intervention and manual operation, fully automatic face annotation systems which have been developed which integrate computer vision-based face detection and face recognition (FR) techniques.

The accuracy of face detection has improved considerably over the past decade, allowing it to consequently become a mature technique. Face recognition (FR) techniques comprise a very active field of research and can be divided into two types: single FR classifiers and multiple FR classifiers. Single FR classifiers do not perform well under uncontrolled, fluctuant conditions which feature changes in illumination, facial expressions, and so on. However, a combination of different single FR classifiers results in improvement of face recognition accuracy even under fluctuant conditions.

Recently, the framework of a distributed FR database and its corresponding FR classifier has been proposed to facilitate a reduction in the computational complexity, and improvement of the accuracy of face annotation, for each member in an OSN. However, these FR database methods that rely on only a single FR classifier may cause unfavourable accuracy results under uncontrolled conditions.

Accordingly, how to efficiently and accurately achieve highly reliable face annotation results has become an essential topic to researchers for the development of face annotation techniques in OSNs.

SUMMARY OF THE INVENTION

Accordingly, the present invention is directed to a novel collaborative face recognition algorithm by which to produce a high-efficiency and high-accuracy automatic face annotation system for personal photographs shared on online social networks.

The invention provides a face annotation method adapted for a current owner to annotate contacts in online social networks (OSNs). The face annotation method includes: providing a Hierarchical Database Access (HDA) architecture for each member according to various social network contexts; providing a Fused Face Recognition (FFR) unit which uses an Adaboost algorithm to fuse a plurality types of base classifiers; and constructing a Face Recognizer by integrating the HDA architecture and the corresponding FFR unit for the owner and each member via respective types of the social network contexts; and selecting suitable personalized Face Recognizers and merging multiple personalized Face Recognizer results by using at least two collaborative FR strategies.

According to an embodiment of the invention, the social network contexts include a recurrence context, a temporal context, and a group context.

According to an embodiment of the invention, the HDA architecture includes four layers of database, wherein a first layer is based on the recurrence context, a second layer is based on the temporal context or the temporal-group context, a third layer is based on the group context, and a fourth layer contains all face images of the members and the owner.

According to an embodiment of the invention, the FFR unit includes a training process and a testing process, wherein the training process trains each base classifier using tagged face images obtained from photo collections of the owner shared on the OSNs, and the testing process uses weights trained from the training process to generate an AdaBoost result score of an unlabeled query face image.

According to an embodiment of the invention, the training process comprises: initializing weights of face images based on the Adaboost algorithm; calculating an error rate of each of the base classifier; and after the weights of the base classifier is calculated, each of the base classifiers is iteratively boosted by updating the weights of samples during each round.

According to an embodiment of the invention, the testing process comprises: calculating the AdaBoost result score using a linear combination of base classifiers with the updating weights.

According to an embodiment of the invention, wherein the step of constructing the Face Recognizer by integrating the HDA architecture and the corresponding FFR unit comprises: accessing a level of the HDA architecture with an query face image in order of priority according to the social network contexts; if a face recognition score of the query face image is higher than a face recognition threshold, the query face image is tagged; and if the face recognition score of the query face image is lower than the face recognition threshold when the lowest priority of the social network contexts is accessed, the query face image is regarded as unidentified.

According to an embodiment of the invention, the collaborative FR strategies includes employing the owner with a Highest Priority Rule and utilizing a Weighted Majority Rule, wherein the step of employing the owner with the Highest Priority Rule comprises: when the owner uploads unlabelled query face images onto the OSN, the Face Recognizer of the owner with the highest priority annotates identity labels of the query face images, and the Face Recognizers selected from the members recognizes unidentified query face images, wherein the step of utilizing the Weighted Majority Rule comprises: selecting and merging the Face Recognizers of the owner and the members, and annotating the identity labels of the query face images according to scores calculated from the merged Face Recognizers.

The invention also provides a face annotation system adapted for an owner to annotate members in online social networks (OSNs). The face annotation system comprises: a Hierarchical Database Access (HDA) architecture, a Fused Face Recognition (FFR) unit, and a collaborative face recognizer. The Hierarchical Database Access (HDA) architecture is configured for each member according to various social network contexts. The Fused Face Recognition (FFR) unit is configured for using an Adaboost algorithm to fuse a plurality types of base classifiers. The collaborative face recognizer includes a plurality of Face Recognizers, wherein each of the Face Recognizers is constructed by integrating the HDA architecture and the corresponding FFR unit for the owner and each member via respective types of the social network contexts. Herein, the collaborative face recognizer selects suitable personalized Face Recognizers and merges multiple personalized Face Recognizer results by using at least two collaborative FR strategies.

In light of the foregoing, the face annotation method and the automatic face annotation system includes two major techniques: a Hierarchical Database Access architecture and a Fused Face Recognition unit. The personalized Hierarchical Database Access architecture for each member is constructed by taking advantage of various social network context types to substantially reduce time consumption. The personalized and adaptive Fused Face Recognition unit for each member may uses the Adaboost algorithm to fuse several different types of base classifiers to produce highly reliable face annotation results. In order to efficiently select suitable personalized Face Recognizers and then effectively merge multiple personalized Face Recognizer results, two collaborative FR strategies are also included: employing the owner with a Highest Priority Rule and utilizing a Weighted Majority Rule. Accordingly, accuracy and efficiency are enhanced in the fully automatic collaborative face annotation system of distributed online social networks.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
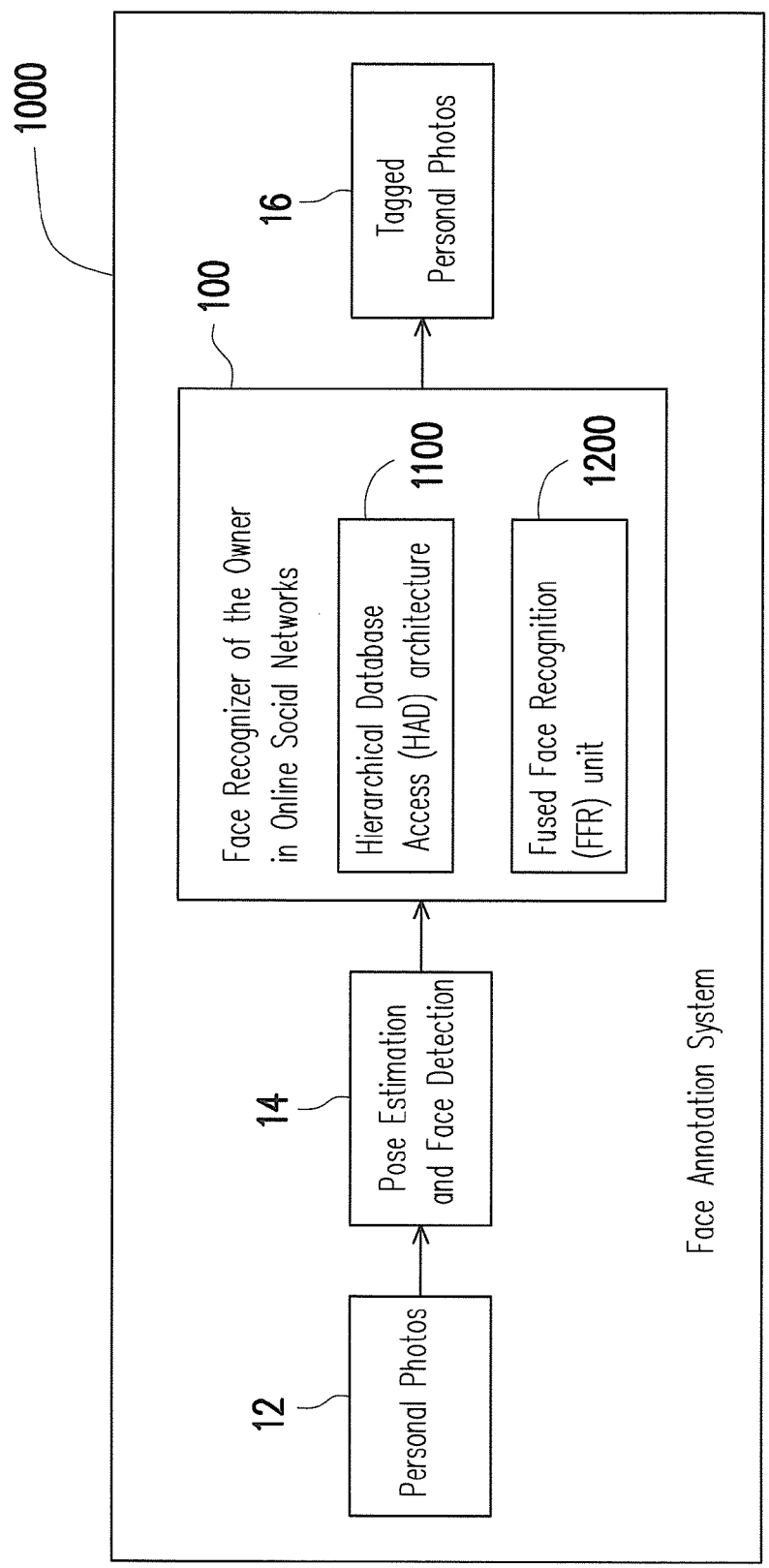
FIG. 1 is a block diagram illustrating a face annotation system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a face annotation system according to an embodiment of the invention. With reference to FIG. 1, the present embodiment provides a high-efficiency and high accuracy collaborative face annotation system 1000 for online social networks (OSNs). In the face annotation system 1000, unlabeled face images extracted from the personal photos 12 of the owner uploaded to an OSN may undergo a pose estimation and face detection 14. Face Recognizer of the Owner 100 may use the results from the pose estimation and face detection 14 to identify people and the tagged photos 16 are generated. More specifically, the face annotation system 1000 comprises two major techniques: a multi-level Hierarchical Database Access (HDA) architecture 1100 and a Fused Face Recognition (FFR) unit 1200 which are combined into the face Recognizer of the Owner 100 that can be applied to the distributed OSN.

The HDA architecture 1100 is for each member of an OSN by taking advantage of various social network context types, including temporal context, group context, and recurrence context. These types of context consequently facilitate the FFR unit 1200 to efficiently recognize high-dependence identities by determining highly possible occurrence or recurrence in query photos.

Most personal photos shared on OSNs were captured in uncontrolled conditions, such as changes in illumination, facial expression, and so on. To achieve high accuracy, the FFR unit 1200 utilizes the AdaBoost algorithm (Y. Freund et al., *A decision-theoretic generalization of on-line learning and an application to boosting*, J. Comput. Syst. Sci., vol. 55, no. 1, pp. 119-139, 1997; Y. Sun, et al., *Cost-sensitive boosting for classification of imbalanced data*, Pattern Recognition, vol. 40, no. 12, pp. 3358-3378, 2007) which is able to effectively fuse multiple FR classifier results with social information and thereby produce a highly reliable result. Hence, each member of an OSN has their own personalized Face Recognizer that integrates the HDA architecture 1100 and the corresponding FFR unit 1200.

In addition, the present embodiment further provides two collaborative FR strategies in the distributed OSN: collaborative face recognition by employing the owner with a Highest Priority Rule (HPR), and collaborative face recognition by utilizing a Weighted Majority Rule (WMR). These strategies can merge multiple personalized face recognizers in a distributed OSN to achieve high efficiency and high accuracy in the proposed fully automatic face annotation system 1000.

The following describes the HDA architecture 1100 which is constructed by using social network context and information to provide the FFR unit 1200 with high-dependence identities to accomplish a high-efficiency match.

A. Hierarchical Database Access Architecture

The three different types of social network context used in the HDA architecture 1100 include recurrence context, temporal context, and group context, and are described as follows:

(1) Recurrence Context: Generally, when an individual appears in one query photo, it is conjectured that the same individual has a high probability of appearing in rest of that set of query photos.

(2) Temporal Context: If an individual has frequently and recently appeared in personal photo collections of a specific owner, it can be inferred that the owner interacts frequently with that individual. Hence, individuals with high degrees of interaction have high probabilities of occurring in query photos.

(3) Group Context: If an individual from a certain group appears in a personal photo collection, then it can be inferred that other individuals belonging to the same group will have high probabilities of appearing in the same personal photo collection.

Figure 2:
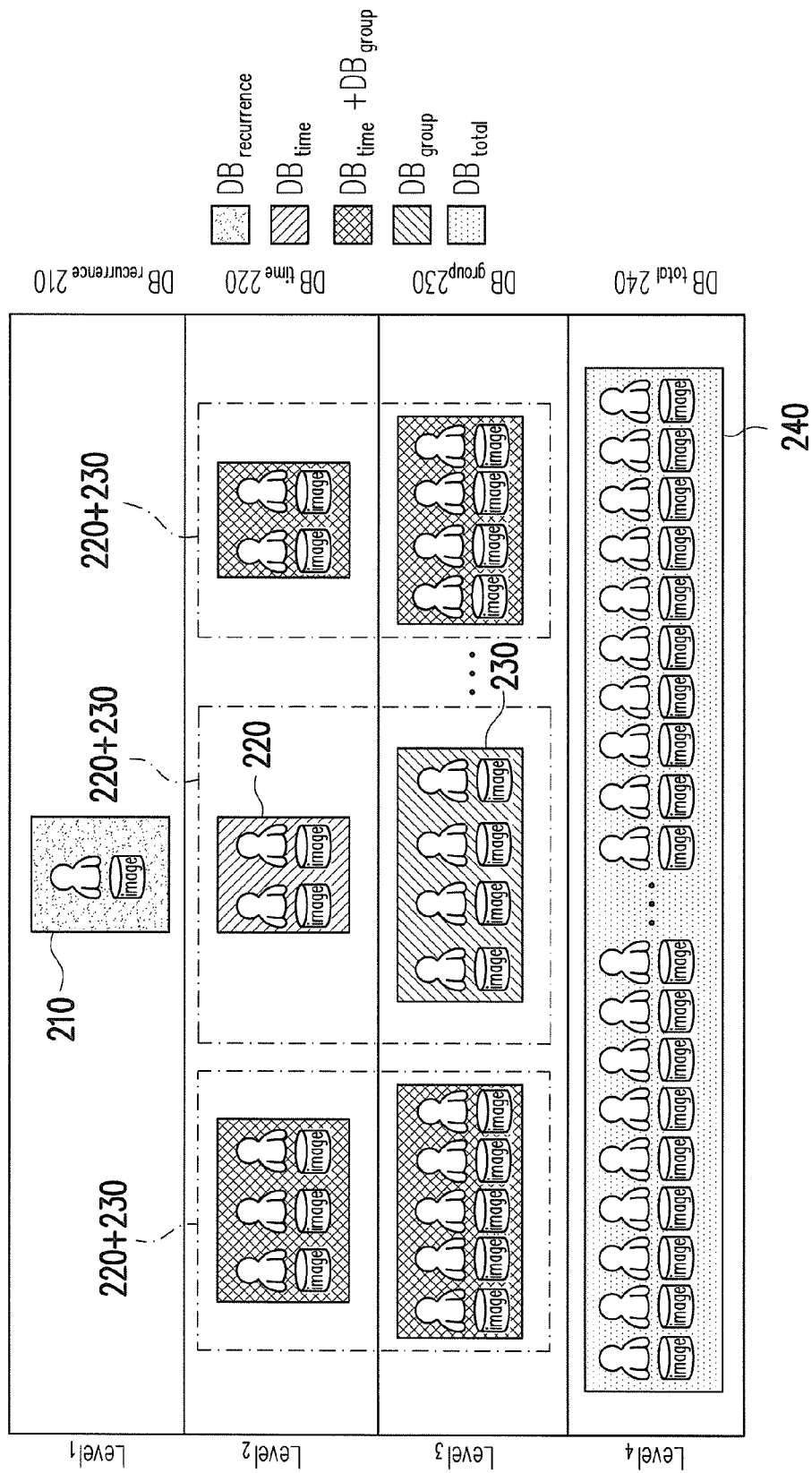
FIG. 2 is a block diagram illustrating a Hierarchical Database Access (HDA) according to an embodiment of the invention.

FIG. 2 is a block diagram illustrating a Hierarchical Database Access (HDA) 1100 according to an embodiment of the invention. With reference to FIG. 2, a HAD architecture 1100 denoted as HDAA={Level$_n$}$^4_{n=1}$ is a set of databases wherein level$_n$ represents the nth level of databases, which is composed of four levels of databases: 1st level databases DB$_{recurrence}$ 210, 2nd level databases DB$_{time}$ 220, 3rd level databases DB$_{group}$ 230, and 4th level databases DB$_{total}$ 240. The face images of each identity with multiple poses can be obtained by using the pose estimation approach for each level.

The 1st level of databases, level$_1$, is based on the recurrence context and defined as DB$_{recurrence}$ 210 with the highest priority access in the HDA architecture 1100. When the identities of individuals have been labeled in the query photos, these identities will be updated in DB$_{recurrence}$ 210 that facilitates the FFR unit 1200 to enhance the accuracy of face recognition.

The 2nd level of databases, level$_2$, is based on the temporal context of each group and is set to DB$_{time}$ 220 with the second highest priority access in the HDA architecture 1100. In order to select only the highly interactive identities from each group for building DB$_{time}$ 220, the strength of interaction can be quantified by a proposed normalized interaction score evaluation between the owner and each member who is in the contact list during a period of recent activity.

The normalized interaction scores can be calculated by estimating the probabilities of occurrence and co-occurrence of the identities in photo collections shared on an OSN. Let $l_{owner}$ represent the identity label of the owner, and let ID$_{contacts}$={$l_m$}$^M_{m=1}$ be an identity set composed of M identity labels of contacts that are in the contact list of the owner. The normalized interaction scores $\phi_m$ can be expressed as follows:

$$\phi_m = \frac{E_m}{Z} \quad \text{Equation (1)}$$

wherein $$Z = \sum_{m=1}^{M} E_m$$

represents the sum of interaction scores of all contacts, and the interaction score $E_m$ of the mth contact can be calculated as follows:

$$E_m = e^{\beta(Pr_{occur}(l_m|\Delta t)) + (1-\beta)(Pr_{co\text{-}occur}(l_m, l_{owner}|\Delta t))} \quad \text{Equation (2)}$$

wherein the parameter $\beta (0 \leq \beta \leq 1)$ reflects the ratio of the occurrence probability Pr$_{occur}$ ($l_m|\Delta t$) and the co-occurrence probability Pr$_{co\text{-}occur}$ ($l_m, l_{owner}|\Delta t$). The probability of occurrence during the recent period $\Delta t$ for each contact {$l_m$}$^M_{m=1}$ can be expressed as:

$$Pr_{occur}(l_m|\Delta t) = \frac{\sum_{I \in (I_{owner}|\Delta t)} \psi_1(l_m, I)}{|(I_{owner}|\Delta t)|} \quad \text{Equation (3)}$$

wherein $l_m \in$ ID$_{contacts}$, and $\psi_1(l_m, I)$ is a characteristic function which returns one when the identity label of the mth contact is labeled in personal photo I; otherwise, a characteristic function returns zero. ($I_{owner}|\Delta t$) denotes the entire collection of personal photos possessed by the owner during the recent period, $\Delta t$ and |·| represents the total number of photos in a set. Moreover, the probability of co-occurrence between the owner and the mth contact during the recent period $\Delta t$ can be expressed as:

$$Pr_{co\text{-}occur}(l_m, l_{owner}|\Delta t) = \frac{\sum_{I \in (I_{OSN}|\Delta t)} \psi_2(l_m, l_{owner}, I)}{|(I_{OSN}|\Delta t)|} \quad \text{Equation (4)}$$

wherein $l_m \in$ ID$_{contacts}$, and $\psi_2(l_m, l_{owner}, I)$ is a pair-wise characteristic function which returns one when both the mth contact and the owner are labeled in photo I; otherwise, a pair-wise characteristic function returns zero. ($I_{OSN}|\Delta t$) denotes all photo collections of the owner and the corresponding contacts that contain all personal photos accessed by the owner during the recent period $\Delta t$.

In order to enhance the efficiency of the HDA architecture 1100, suitable identities in each group with which to build DB$_{time}$ are selected. Let {$G_u$}$^{NG}_{u=1}$ be a group set composed of NG groups, and let {$g_{u,b}$}$^{G_u}_{b=1}$ be a set consisting of all members in a group $G_u$. The members in each group who have had the most recent interaction with the owner are defined as follows:

$$\tilde{G}_u = \{g_{u,b} \mid \Omega(g_{u,b}) > 0, g_{u,b} \in G_u\} = \{\tilde{g}_{u,v}\}^{|\tilde{G}_u|}_{v=1} \quad \text{Equation (5)}$$

wherein the function $\Omega(\cdot)$ returns the normalized interaction score for a given group member $g_{u,b}$. Next, all members in each $\tilde{G}_u$ are sorted according to their corresponding normalized interaction scores $\phi_m$. The highly interactive identities of each group may be determined when their normalized interaction scores are higher than the corresponding interactive threshold TH$_{\tilde{G}_u}$ of each group, which is calculated as follows:

$$TH_{\tilde{G}_u} = \frac{1}{B_u} \sum_{v=1}^{B_u} \Omega(\tilde{g}_{u,v}) \quad \text{Equation (6)}$$

wherein $B_u$ is the number of specific members who are selected when $$\{\Omega(\tilde{g}_{u,v})\}^{|\tilde{G}_u|}_{v=1}$$

is higher than the upper quartile value of all corresponding normalized interaction scores from each $\tilde{G}_u$. These selected highly interactive identities from each group can be used to build DB$_{time}$.

DB$_{group}$ is based on group context and defined with the third highest priority accessed in the HDA architecture 1100. If the query image cannot be matched to a small number of highly interactive members from a specific group, it will be exhaustively compared to all relevant identities from the same group.

DB$_{total}$ comprises M+1 identities that include the owner and all members of the contact list. Owing to the fact that DB$_{total}$ is the largest size of database containing all identities, the DB$_{total}$ is defined with the lowest priority access in the HDA architecture 1100. Note that traditional face annotation systems utilize all identities to build DB$_{total}$; this excess is extremely time-consuming.

B. Fused Face Recognition Unit

In order to acquire face recognition results with high accuracy, the FFR unit 1200 is based on the AdaBoost algorithm and can be used to achieve accurate and efficient recognition in a specific database by using the HDA architecture 1100 provided with high-dependence identities. Specifically, the FFR unit 1200 can effectively fuse several single FR classifiers (called base classifiers) and take advantage of social network context and information to provide an adaptive and personalized FFR unit 1200 for the owner and each member of an OSN. The AdaBoost algorithm is an iterative boosting process used to build a strong classifier by the linear combination of several base classifiers with corresponding weights. These weights are determined according to the classification performance of each base classifier trained with the personalized social network context.

It is noted that the confidence scores of the base classifier outputs in the proposed FFR unit 1200 is calculated as the followings. Let $F_{owner} = \{f_{\theta,n}(j)\}_{j=1}^{K}$ be a target set which includes K different identities of corresponding face images, wherein $f_{\theta,n}(j)$ denotes the jth identity with a particular pose index $\theta \in P_j$ in the nth level accessed from the HDA architecture 1100, and $P_j = \{p_\theta\}_{\theta=1}^{NPj}$ expresses the pose set of the jth identity which includes NPj poses. Also, let $Q = \{q_\theta(i)\}_{i=1}^{NQ}$ be a query set composed of NQ unlabeled face images extracted from the personal photos of the owner uploaded to an OSN by the pose estimation and face detection approach, where $q_\theta(i)$ denotes the ith query face image with a particular pose $\theta$. The face detection approach is well-known to those skilled in the art and it will not be further explained herein.

Then, the query feature vector $v\text{-}q_\theta{}^t(i)$ and the target feature vector $v\text{-}f_{\theta,n}{}^t(j)$ are respectively extracted from the unlabeled query face image $q_\theta(i)$ and target face image $f_{\theta,n}(j)$ through T different types of base classifiers $h_t$. Note that t is the index of base classifiers. The nearest neighbour discriminant function is applied to compute the distance scores $d_t(i,j)$ between query feature vector $v\text{-}q_\theta{}^t(i)$ and target feature vector $v\text{-}f_{\theta,n}{}^t(j)$ in the feature space.

The distance scores $d_t(i,j)$ calculated by various types of base classifiers may not be comparable in the different feature space. Hence, the distance scores $d_t(i,j)$ of each different base classifier $h_t$ is converted into the corresponding confidence scores $c_t$ that can be expressed by using a sigmoid activation function as follows:

$$c_t(i, j) = \frac{1}{1 + e^{(d_t(i,j))}}, t = 1, 2, \ldots , T \qquad \text{Equation (7)}$$

Figure 3A:
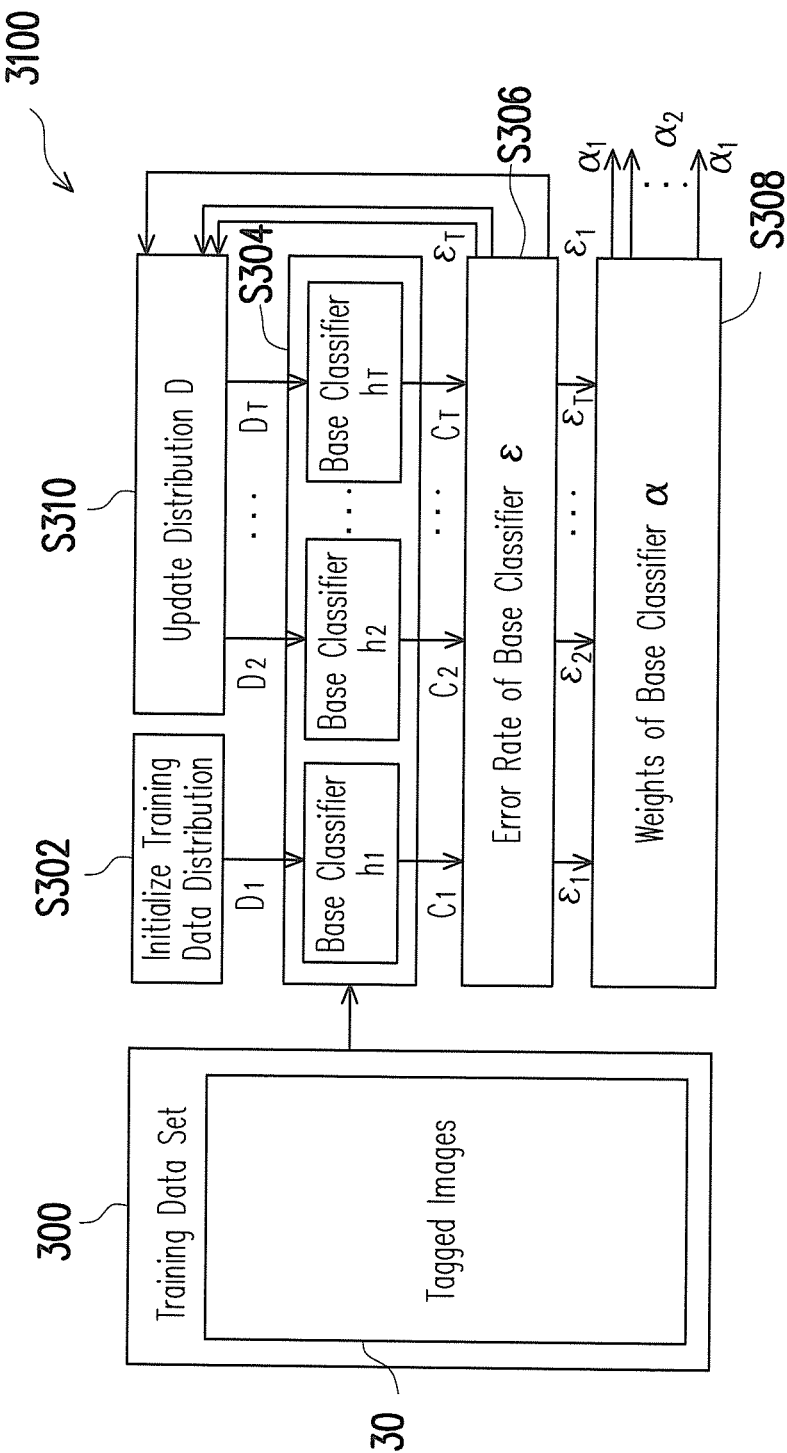
FIG. 3A and FIG. 3B are flowcharts illustrating the FFR unit according to an embodiment of the invention.
Figure 3B:
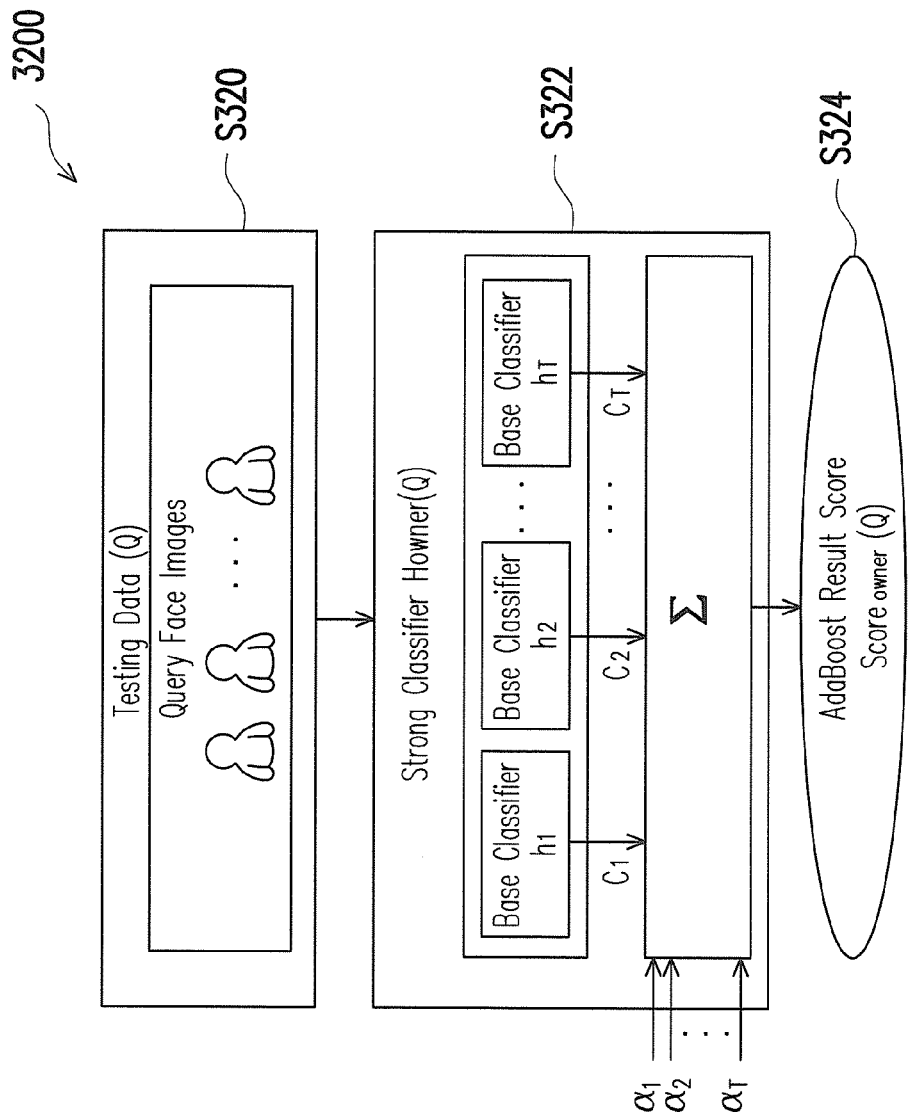

After describing the confidence scores $c_t$ of the base classifier, the FFR unit 1200 for face recognition in OSNs based on the AdaBoost algorithm can be used to combine the different types of base classifiers. FIG. 3A and FIG. 3B are flowcharts illustrating the FFR unit according to an embodiment of the invention. With reference to FIG. 3A and FIG. 3B, the FFR unit 1200 includes two main processes: a training process 3100 and a testing process 3200.

(1) Training Process:

In order to construct the personalized FFR unit 1200, each base classifier is trained by using tagged face images 30 obtained from all photo collections of the owner shared on OSNs. As shown in FIG. 3A, a given training data set 300 can be denoted as follows:

$$S = \{(x_i, l_i)\}_{i=1}^{N} \qquad \text{Equation (8)}$$

wherein N is the number of tagged face image samples, let $X = \{x_i\}_{i=1}^{N}$ be a set of tagged face images, and identity labels of tagged face images are represented by $l_i \in ID_{contacts}$.

In step S302, the initial weight of the distribution on the ith face image sample is defined by $D_1(i) = 1/N$ for all i, wherein N is the number of face image samples in the training data set 300. The weights of face image samples are based on the Adaboost algorithm and are primarily used to express the learning difficulty of the sample in the training process. In other words, a greater learning difficulty encountered when the face image samples are used from all photo collections of the owner will result in a greater corresponding weight of distribution. This, in turn, will result in enhancement of the learning capacity, which improves the face recognition accuracy for the personalized FFR unit 1200. In step S304, each base classifier is trained with the training data set 300 of the owner in the personalized FFR unit 1200. A set of base classifier outputs for each boosting round t=1, 2 . . . T is denoted as $h_t(x_i) = \{c_t(i,j)\}_{j=1}^{K}$, wherein T denotes the number of base classifiers, K represents the number of identities in the target set $F_{owner}$, and $c_t(i, j)$ is a confidence score of the ith face image sample belonging to the jth identity of target set $F_{owner}$.

In step S306, a critical step in the estimation of the classification performance of each base classifier is the calculation of the error rate $\epsilon_t$ of base classifier $h_t$. This is accomplished via the weight distribution of the misclassified sample for each base classifier. The error rate $E_t$ of base classifier ht can be calculated as follows:

$$\epsilon_t = Pr_{i \sim D^t}[l(f_{\theta,n}(j^*)) \neq l_i] \qquad \text{Equation (9)}$$

in other words, $$\epsilon_t = \sum_{i: (f_{\theta,n}(j^*)) \neq l_i} D_t(i) \qquad \text{Equation (10)}$$

wherein $j^* = \arg\max h_t(x_i)$ and $l(\cdot)$ is defined as a function that returns the corresponding identity label for a given target face image.

In step S308, the weight of base classifier $\alpha_t$ reflects the classification performance of the tth base classifier in the personalized FFR unit 1200, and can be calculated by the error rate $\epsilon_t$ of base classifier ht as follows:

$$\alpha_t = \frac{1}{2}\ln\left(\frac{1-\epsilon_t}{\epsilon_t}\right) \qquad \text{Equation (11)}$$

After the weight of each base classifier $\alpha_t$ is calculated, as shown in step S310, each base classifier $\alpha_t$ can be iteratively boosted by updating the weight distributions of the samples during each round. Furthermore, this update distribution rule is able to facilitate the focus of the next base classifier $h_{t+1}$ on the misclassified samples to achieve face annotation accuracy. The weight distributions of the samples increase when those samples are misclassified by the base classifier $h_t$; otherwise, the weights of the samples decrease when the samples are correctly classified. Consequently, each weight distribution $D_{t+1}$ of the sample in the next round t+1 becomes a proper probability distribution for each sample. Each weight distri bution of the sample $D_t$ is updated in regard to the weight of base classifier at as follows:

$$D_{t+1}(i) = \frac{D_t(i)}{Z_t} \times \begin{cases} e^{-\alpha_t}, & \text{if } \ell\ (f_{\theta,n}(j^*)) = l_i \\ e^{\alpha_t}, & \text{if } \ell\ (f_{\theta,n}(j^*)) \neq l_i \end{cases} \quad \text{Equation (12)}$$

wherein $j^* = \arg\max h_t(x_i)$ and $$Z_t = \sum_{i=1}^{N} D_{t+1}(i)$$

is a chosen normalization constant.

(2) Testing Process:

As shown in FIG. 3B, in step S322, a strong classifier in the personalized FFR unit 1200 based on the AdaBoost algorithm is trained by the linear combination of base classifiers $h_t$ with the updating weights $\alpha_t$. Given a test sample of unlabeled query face images $q_\theta(i)$ in testing data 320, the strong classifier can be expressed as follows:

$$H_{owner}(q_\theta(i)) = l(f_{\theta,n}(j^*)) \quad \text{Equation (13)}$$

wherein $$j^* = \arg\max_j \sum_{t=1}^{T} \alpha_t h_t(q_\theta(i)),$$

and $l(\cdot)$ is defined as a function that returns the corresponding identity label for a given query face image. Finally, in step S326, the AdaBoost result score of corresponding unlabeled query face images $q_\theta(i)$ can be calculated as follows:

$$\text{Score}_{owner}(q\theta(i)) = \max \sum_{t=1}^{T} \alpha_t h_t(q_\theta(i)) \quad \text{Equation (14)}$$

The advantage of the personalized FFR unit 1200 used in an OSN is that it can combine several base classifiers with the personalized weights of each base classifier, which are adjusted dynamically according to the classification performance of each base classifier trained with the personal photo collection of a particular owner.

C. Face Annotation System in Online Social Networks

Figure 4:
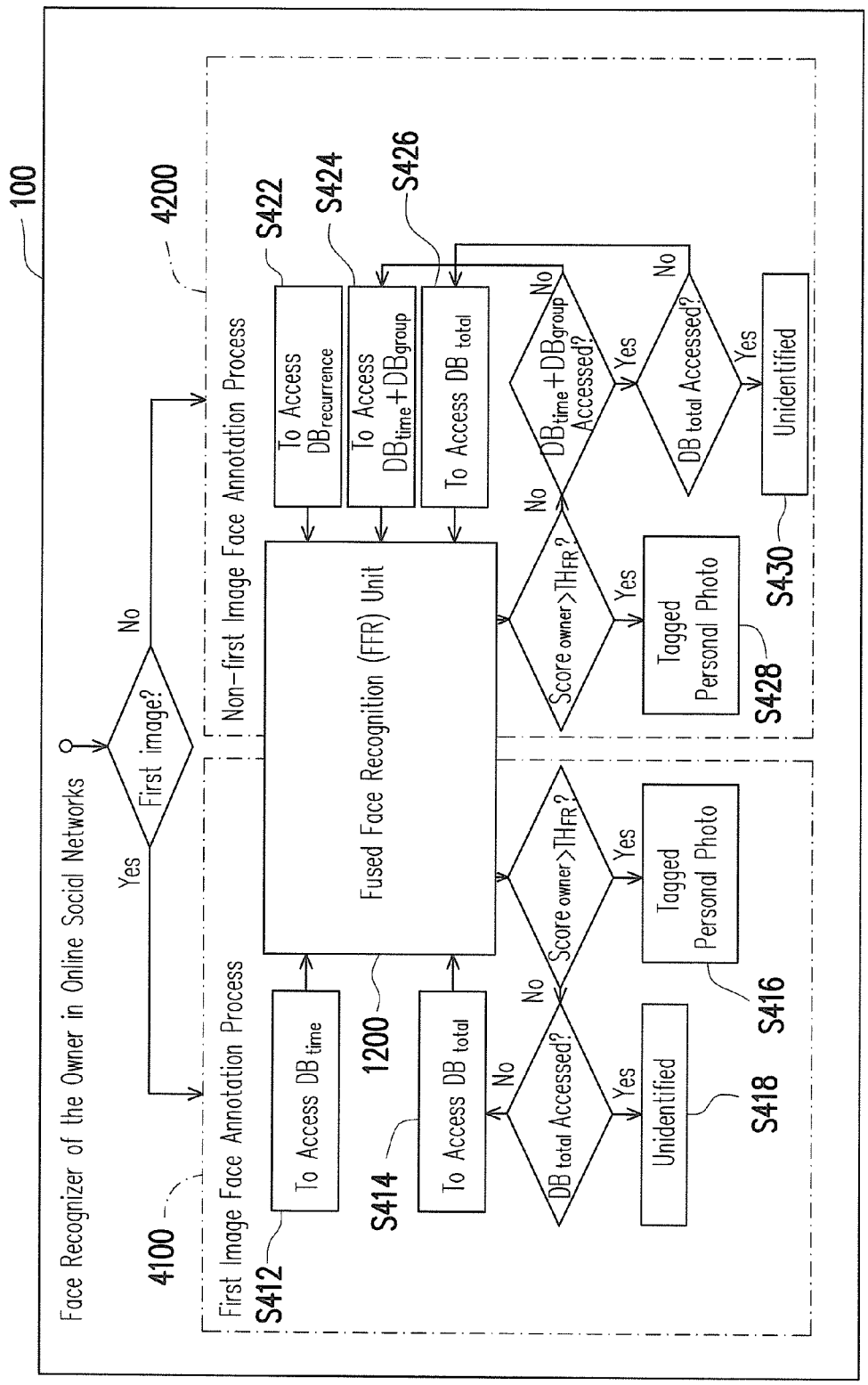
FIG. 4 is a flowchart diagram of face recognizer for an owner in an OSN according to an embodiment of the invention.

The personalized Face Recognizer is constructed by which to achieve high-accuracy and high-efficiency face annotation in OSNs. This technique integrates the HDA architecture 1100 and the corresponding personalized FFR unit 1200 for the owner and each member of the contact list via respective types of social network context. When an owner uploads unlabeled personal photos onto the OSN, the face images and corresponding poses can be extracted from these personal photos by using pose estimation and face detection approaches. FIG. 4 is a flowchart diagram of face recognizer for an owner in an OSN according to an embodiment of the invention. With reference to FIG. 4, the proposed personalized Face Recognizer consists of two face annotation processes: the first image face annotation process 4100 and the non-first image face annotation process 4200. These facilitate the FFR unit 1200 to match query images with high-dependence identities from the HDA architecture 1100.

(1) First Image Face Annotation Process:

With reference to FIG. 2 and FIG. 4, the FFR unit 1200 with the first query face image $q_\theta(1)$ accesses a specific level of the HDA architecture 1100 in order of priority as follows: $DB_{time}$ 220 (step S412) and $DB_{total}$ 240 (step S414). The result score of face recognition $\text{Score}_{owner}(q_\theta(1))$ is obtained from the FFR unit 1200 with the first query face image $q_\theta(1)$ recognized via face images of all identities provided by $DB_{time}$ 220. Because of this, as shown in step S416, the first query face image $q_\theta(1)$ is tagged with the corresponding identity label when the result score of face recognition $\text{Score}_{owner}(q_\theta(1))$ is higher than the face recognition threshold $TH_{FR}$, which is based on the average of confidence scores over the training data set of N samples. If the first query face image $q_\theta(1)$ cannot be recognized by using the face images of all identities provided by $DB_{time}$ 220, the FFR unit 1200 employs all identities accessed from the next level of database $DB_{total}$ 240 (as shown in step S414). However, access of the database $DB_{total}$ 240 may yield a result score of face recognition $\text{Score}_{owner}(q_\theta(1))$ that is still lower than the face recognition threshold $TH_{FR}$. This indicates that the first query face image has been misclassified and is defined as unidentified (step S418), whereupon the next query face image is regarded as the new first query face image until the new first one is tagged. After performance of the first image face annotation process 4100, the first query face image has been annotated and the identity label of the first query face image is updated in $DB_{recurrence}$ 210. All identities of the corresponding group can then be used to build $DB_{group}$ 230 and support the four specific levels of the HDA architecture 1100 and subsequently the non-first image face annotation process 4200.

(2) Non-First Image Face Annotation Process:

In order to facilitate enhancement of face recognition accuracy and efficiency with high-dependence identities by the FFR unit 1200, the succeeding query face image is recognized with a specific level of the HDA architecture 1100 in order of priority as follows: $DB_{recurrence}$ 210 (step S422), $DB_{time}$ 220 and $DB_{group}$ 230 (step S424), and $DB_{total}$ 240 (step S426). When the result score of face recognition $\text{Score}_{owner}(q_\theta(i))$ is higher than the face recognition threshold $TH_{FR}$ in each access database, $DB_{recurrence}$ 210, $DB_{time}$ 220, $DB_{group}$ 230 and $DB_{total}$ 240, the query face image $q_\theta(i)$ is tagged with the corresponding identity label (step S428), and the identity label of query face image $q_\theta(i)$ is updated in the corresponding database at the same time; otherwise, the non-first first query face image is defined as unidentified (step S430), D. Collaborative Face Recognition for Face Annotation in Online Social Networks The collaborative FR framework features two collaborative FR strategies for face annotation in a distributed OSN: the owner with a Highest Priority Rule (HPR) strategy and the Weighted Majority Rule (WMR) strategy. In order to produce a high-reliability identity label for face annotation, the Collaborative Face Recognizer which is able to effectively merge multiple personalized Face Recognizer results is introduced herein before describing the two collaborative FR strategies.

(1) Collaborative Face Recognizer for Face Annotation:

The Collaborative Face Recognizer is able to select a suitable personalized Face Recognizer and effectively combines results of multiple personalized Face Recognizers. Due to the fact that the owner has one type of personalized HDA architecture 1100, the suitable personalized Face Recognizers can be selected by the specific level of the constructed database $DB_{time}$, which has highly interactive identities.

Figure 5A:
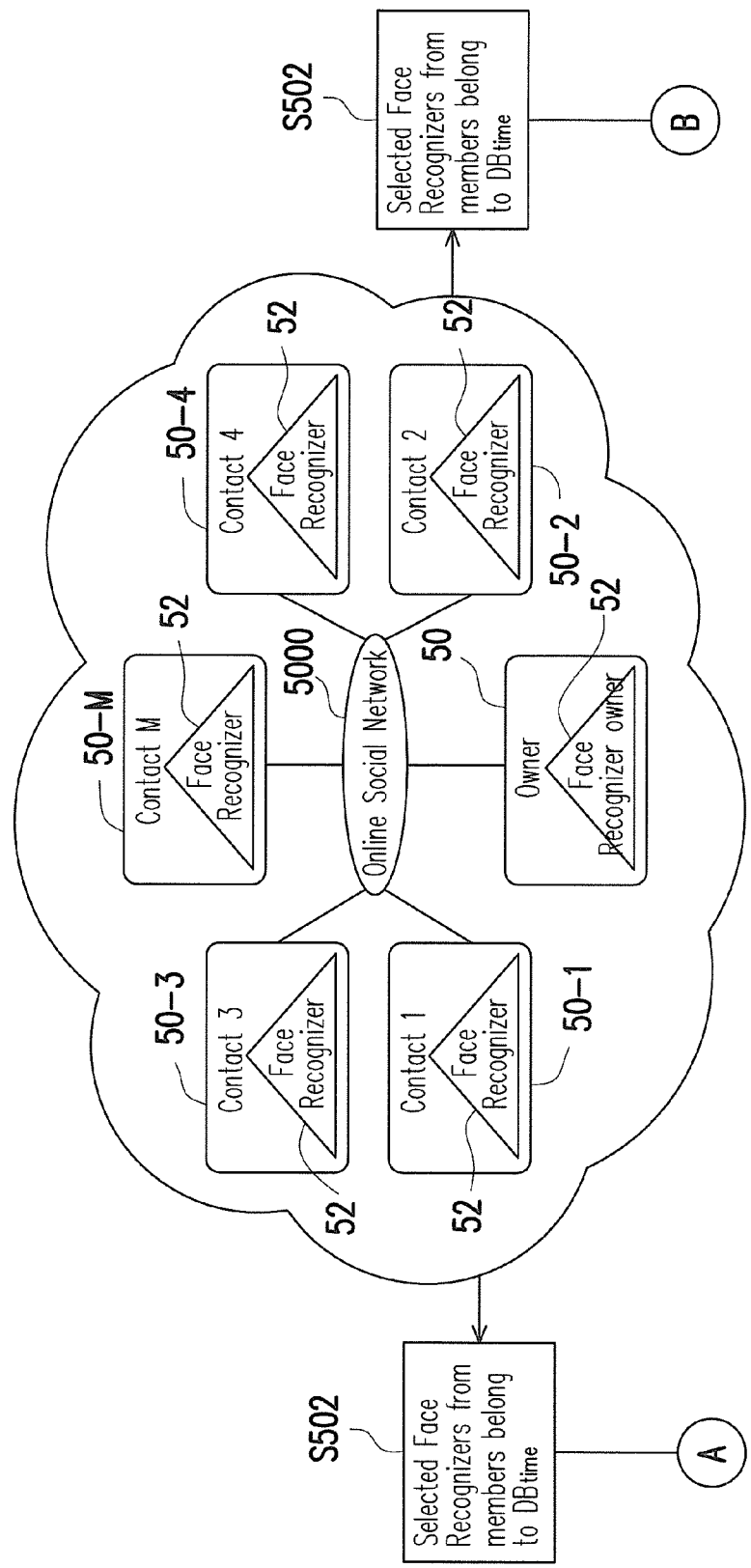
FIG. 5A is a flowchart diagram illustrating a framework of collaborative face recognition for face annotation in distributed OSNs according to an embodiment of the invention.

FIG. 5A is a flowchart diagram illustrating a framework of collaborative face recognition for face annotation in distributed OSNs according to an embodiment of the invention. With reference to FIG. 5A, in the collaborative face recognition framework for the current owner 50, each member (e.g. contact 50-1~50-M) has one personalized Face Recognizer 52 shared on distributed OSN 5000. As shown in step S502, the Face Recognizers from members belong to $DB_{time}$ may be selected for the following collaborative FR Strategies.

Specifically, the selected K personalized Face Recognizers $\{H_j\}^K_{j=1}$ belonging to the identities which are determined to have high levels of interaction with the owner are very likely to be able to correctly recognize the unlabeled face images in the query set and return the corresponding face recognition results by comparing them to the high-dependence identities of $DB_{time}$ from respective HDA architectures. In order to obtain high-reliability identity labels, the Collaborative Face Recognizer is used to effectively merge multiple Face Recognizer results when those results have been returned. Each Face Recognizer result of identity label $H_j(\cdot)$ and the corresponding result score $Score_j$ can be generated by the respective Face Recognizers. Next, the corresponding normalized interaction scores $\{\phi_j\}^K_{j=1}$ of multiple Face Recognizers can be converted into interaction weights $\{w_j\}^K_{j=1}$, whereupon the result scores $\{Score_j\}^K_{j=1}$ can be combined with the corresponding interaction weights $\{w_j\}^K_{j=1}$ to obtain the collaborative face recognition result with high accuracy. The normalized interaction scores $\{\phi_j\}^K_{j=1}$ of multiple Face Recognizers is converted into corresponding interaction weights $\{w_j\}^K_{j=1}$ that can be expressed by utilizing numerical approximation method as follows:

$$w_j = \frac{\phi_j}{\sum_{j=1}^{K} \phi_j}, \text{ where} \sum_{j=1}^{K} w_j = 1 \quad \text{Equation (15)}$$

In order to accomplish highly accurate face annotation on a query face image $q_\theta(i)$, the optimal identity label Identity of fused face recognition can be obtained by a weighted combination of result scores $\{Score_j\}^K_{j=1}$ of multiple Face Recognizer, which can be expressed as follows:

$$\text{Identity}=CFR(q_\theta(i))=H_{j*}(q_\theta(i)) \quad \text{Equation (16)}$$

wherein $$j^* = \underset{j}{\operatorname{argmax}} \{w_j \cdot Score_j\}^K_{j=1}$$

Figure 5B:
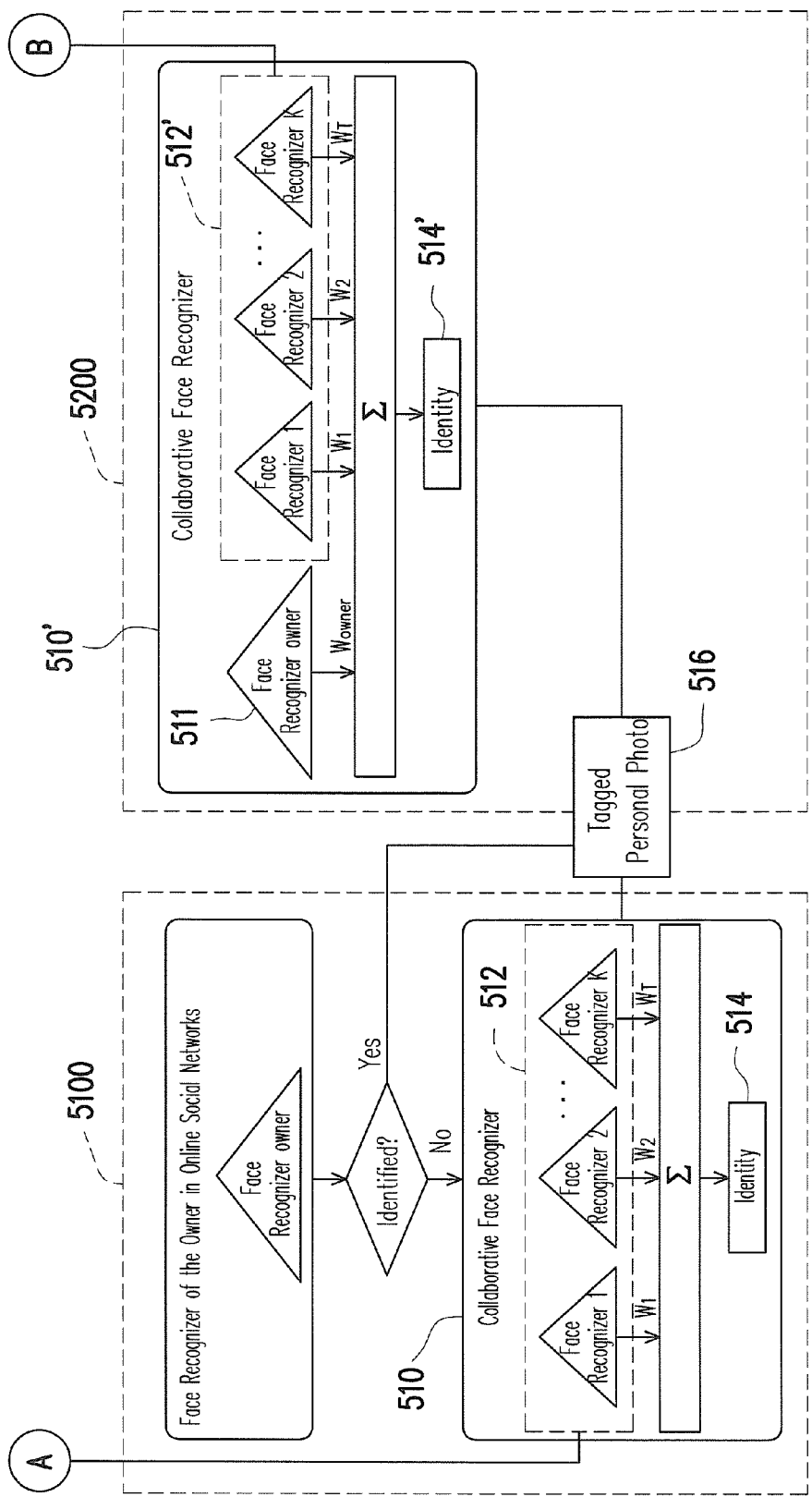
FIG. 5B is a flowchart diagram illustrating a framework of collaborative face recognition for face annotation in distributed OSNs according to an embodiment of the invention.

(2) Collaborative FR Strategies:

FIG. 5B is a flowchart diagram illustrating a framework of collaborative face recognition for face annotation in distributed OSNs according to an embodiment of the invention. With reference to FIG. 5B, in order for a fully automatic face annotation system to achieve high efficiency and high accuracy in distributed OSNs, the collaborative FR framework includes two collaborative FR strategies: the owner with a Highest Priority Rule (HPR) strategy 5100 and the Weighted Majority Rule (WMR) strategy 5200.

Highest Priority Rule (HPR) Strategy:

Since most individuals who appear in personal photos shared on distributed OSNs have close relationships to the owner, and include family members, friends, and classmates, it is believed the personalized Face Recognizer of the owner is the best choice for efficiently and accurately recognizing query face images. Hence, the collaborative face recognition may employ the owner and use the Highest Priority Rule (HPR) strategy 5100 to perform high-reliability identity label assignment and face annotation in distributed OSNs. When the owner uploads unlabeled personal photos onto an OSN, the personalized Face Recognizer of the owner with the highest priority can effectively annotate the identity labels of the query face images, as shown on the left in FIG. 5A.

In the Collaborative Face Recognizer 510, the selected suitable personalized Face Recognizers 512 specifically belong to those contacts which are most interactive with the owner, allowing the selected Face Recognizers 512 to recognize unidentified query face images. Subsequently, the optimal identity label "Identity" (denoted as 514) can be annotated by merging multiple Face Recognizer results of the identity labels $H_j(\cdot)$ in weighted form.

Weighted Majority Rule (WMR) Strategy:

An increase in the number of selected high-dependence Face Recognizers will lead to an increase in the accuracy of multiple face recognition. However, an excessive number of selected Face Recognizers can lead to dramatic increases in time requirements. Furthermore, numerous non-dependence Face Recognizers have a tendency to be merged into invalid face recognition results, and thus degrade the accuracy of face annotation. Therefore, the collaborative face recognition approach herein uses a Weighted Majority Rule (WMR) strategy 5200 to effectively select and merge proper personalized Face Recognizers 512' and Face Recognizer of the owner (denoted as 511) and thereby facilitate improvement of face annotation accuracy in distributed OSNs. The Collaborative Face Recognizer 510' comprises K+1 Face Recognizers $\{H_j\}^{K+1}_{j=1}=\{H_{owner}, H_1, H_2, \ldots, H_K\}$ that include the owner and highly interactive members belonging to the $DB_{time}$ of the owner, as shown on the right in FIG. 5A. Finally, the optimal identity label "Identity" (denoted as 514') can be annotated by using Equation (16) to combine result scores $\{Score_j\}^{K+1}_{j=1}=\{Score_{owner}, Score_1, Score_2, \ldots, Score_K\}$ of K+1 Face Recognizers and corresponding confidence weights $\{w_j\}^{K+1}_{j=1}=\{w_{owner}, w_1, w_2, \ldots, w_K\}$.

To sum up, the face annotation method and the automatic face annotation system provided in an embodiment of the invention take advantage of social network context and the Adaboost algorithm, and involve two primary techniques: the Hierarchical Database Access (HAD) architecture and the Fused Face Recognition (FFR) unit. Two collaborative face recognition strategies are also used which involve the owner with a Highest Priority Rule (HPR) and a Weighted Majority Rule (WMR). Initially, the proposed multi-level Hierarchical Database Access (HDA) architecture facilitates the Fused Face Recognition (FFR) unit to efficiently recognize query photos with high-dependence identities by taking advantage of various social network context types, including temporal context, group context, and recurrence context for each member of the distributed OSN. Consequently, time requirements are dramatically reduced. Next, to greatly enhance face annotation accuracy, the proposed Fused Face Recognition (FFR) unit utilizes the AdaBoost algorithm to effectively fuse the results of multiple base classifiers trained with the personalized social network context and thereby produce a strong, personalized, and adaptive classifier. The personalized Face Recognizer for each member integrates Hierarchical Database Access (HDA) architecture and the Fused Face Recognition (FFR) unit, which can then be applied to the distributed OSN. Furthermore, the collaborative FR strategies by employing the owner with a Highest Priority Rule (HPR) and utilizing a Weighted Majority Rule (WMR) may efficiently select suitable personalized Face Recognizers and effectively merge multiple personalized Face Recognizer results. As a result, accuracy and efficiency are enhanced in the fully automatic collaborative face annotation system of distributed OSNs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A face annotation method, adapted for an owner to annotate members in online social networks (OSNs), comprising:
    providing a Hierarchical Database Access (HDA) architecture for each member according to various social network contexts;
    providing a Fused Face Recognition (FFR) unit which uses an Adaboost algorithm to fuse a plurality types of base classifiers; and
    constructing a Face Recognizer by integrating the HDA architecture and the corresponding FFR unit for the owner and each member via respective types of the social network contexts; and
    selecting suitable personalized Face Recognizers and merging multiple personalized Face Recognizer results by using at least two collaborative FR strategies.

2. The face annotation method as recited in claim 1, wherein the social network contexts include a recurrence context, a temporal context, and a group context.

3. The face annotation method as recited in claim 2, wherein the HDA architecture includes four layers of database, wherein a first layer is based on the recurrence context, a second layer is based on the temporal context or the temporal-group context, a third layer is based on the group context, and a fourth layer contains all face images of the members and the owner.

4. The face annotation method as recited in claim 1, wherein the FFR unit includes a training process and a testing process,
    wherein the training process trains each base classifier using tagged face images obtained from photo collections of the owner shared on the OSNs, and the testing process uses weights trained from the training process to generate an AdaBoost result score of an unlabeled query face image.

5. The face annotation method as recited in claim 4, wherein the training process comprises:
    initializing weights of face images based on the Adaboost algorithm;
    calculating an error rate of each of the base classifier; and
    after the weights of the base classifier is calculated, each of the base classifiers is iteratively boosted by updating the weights of samples during each round.

6. The face annotation method as recited in claim 5, wherein the testing process comprises:
    calculating the AdaBoost result score using a linear combination of base classifiers with the updating weights.

7. The face annotation method as recited in claim 1, wherein the step of constructing the Face Recognizer by integrating the HDA architecture and the corresponding FFR unit comprises:
    accessing a level of the HDA architecture with an query face image in order of priority according to the social network contexts;
    if a face recognition score of the query face image is higher than a face recognition threshold, the query face image is tagged; and
    if the face recognition score of the query face image is lower than the face recognition threshold when the lowest priority of the social network contexts is accessed, the query face image is regarded as unidentified.

8. The face annotation method as recited in claim 1, wherein the collaborative FR strategies includes employing the owner with a Highest Priority Rule and utilizing a Weighted Majority Rule,
    wherein the step of employing the owner with the Highest Priority Rule comprises:
    when the owner uploads unlabelled query face images onto the OSN, the Face Recognizer of the owner with the highest priority annotates identity labels of the query face images, and the Face Recognizers selected from the members recognizes unidentified query face images,
    wherein the step of utilizing the Weighted Majority Rule comprises:
    selecting and merging the Face Recognizers of the owner and the members, and annotating the identity labels of the query face images according to scores calculated from the merged Face Recognizers.

9. A face annotation system, adapted for an owner to annotate members in online social networks (OSNs), the face annotation system comprises:
    a Hierarchical Database Access (HDA) architecture, configured for each member according to various social network contexts;
    a Fused Face Recognition (FFR) unit, configured for using an Adaboost algorithm to fuse a plurality types of base classifiers; and
    a collaborative face recognizer, including a plurality of Face Recognizers, wherein each of the Face Recognizers is constructed by integrating the HDA architecture and the corresponding FFR unit for the owner and each member via respective types of the social network contexts,
    wherein the collaborative face recognizer selects suitable personalized Face Recognizers and merges multiple personalized Face Recognizer results by using at least two collaborative FR strategies.

10. The face annotation system as recited in claim 9, wherein the social network contexts include a recurrence context, a temporal context, and a group context.

11. The face annotation system as recited in claim 10, wherein the HDA architecture includes four layers of database, wherein a first layer is based on the recurrence context, a second layer is based on the temporal context or the temporal-group context, a third layer is based on the group context, and a fourth layer contains all face images of the members and the owner.

12. The face annotation system as recited in claim 9, wherein the FFR unit includes a training process and a testing process,
    wherein in the training process, the FFR unit trains each base classifier using tagged face images obtained from photo collections of the owner shared on the OSNs, and in the testing process, the FFR unit uses weights trained from the training process to generate an AdaBoost result score of an unlabelled query face image.

13. The face annotation system as recited in claim 12, wherein in the training, the FFR unit initializes weights of face images based on the Adaboost algorithm and calculates an error rate of each of the base classifier, and after the weights of the base classifier is calculated, each of the base classifiers is iteratively boosted by updating the weights of samples during each round.

14. The face annotation system as recited in claim 12, wherein in the testing process, the FFR unit calculates the AdaBoost result score using a linear combination of base classifiers with the updating weights.

15. The face annotation system as recited in claim 9, wherein the Face Recognizers accesses a level of the HDA architecture with an query face image in order of priority according to the social network contexts, if a face recognition score of the query face image is higher than a face recognition threshold, the Face Recognizers tags the query face image, and if the face recognition score of the query face image is lower than the face recognition threshold when the lowest priority of the social network contexts is accessed, the Face Recognizers regards the query face image as unidentified.

16. The face annotation system as recited in claim 9, wherein the collaborative FR strategies includes employing the owner with a Highest Priority Rule and utilizing a Weighted Majority Rule, and

- in the strategy of employing the owner with the Highest Priority Rule, when the owner uploads unlabelled query face images onto the OSN, the Face Recognizer of the owner with the highest priority annotates identity labels of the query face images, and the collaborative face recognizer uses the Face Recognizers selected from the members to recognize unidentified query face images, and
- in the strategy of utilizing the Weighted Majority Rule, the collaborative face recognizer selects and merges the Face Recognizers of the owner and the members, and annotates the identity labels of the query face images according to scores calculated from the merged Face Recognizers.

\* \* \* \* \*